UNITED STATES PATENT OFFICE.

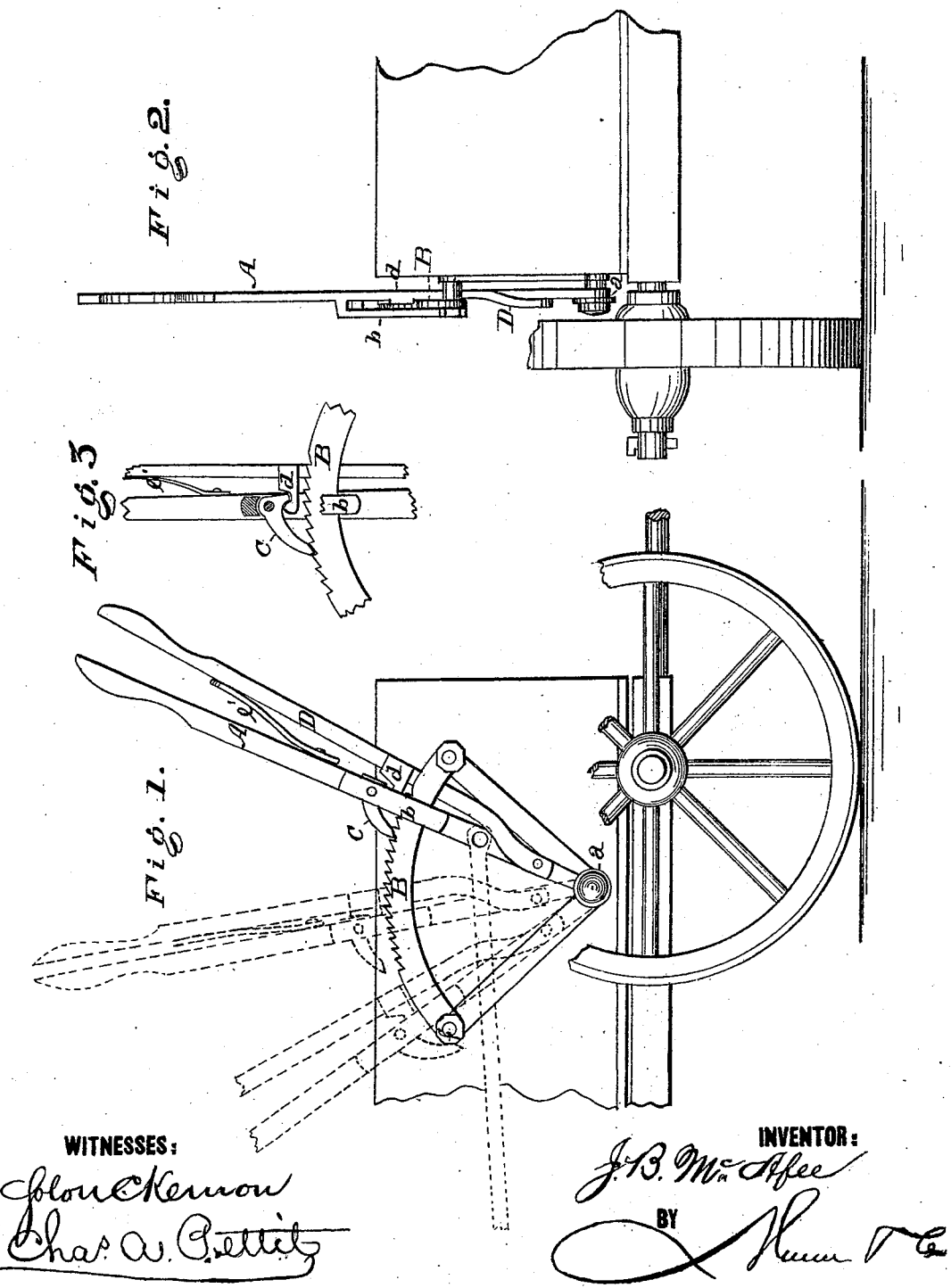

JOSIAH B. McAFEE, OF TOPEKA, KANSAS.

IMPROVEMENT IN WAGON-BRAKE LEVERS.

Specification forming part of Letters Patent No. 184,643, dated November 21, 1876; application filed September 4, 1876.

*To all whom it may concern:*

Be it known that I, JOSIAH B. MCAFEE, of the city of Topeka, county of Shawnee, and State of Kansas, have invented a new and Improved Wagon-Brake; and I do hereby declare that the following is a full, clear, and exact description of the same.

The invention is an improvement in that class of wagon-brakes in which two levers are employed, the same having a common fulcrum, and being so connected by a dog or pawl that when the levers are pressed together said pawl is released from a curved ratchet-bar. An example of this class of brakes appears in Patent No. 126,964.

According to my invention, the ratchet-bar is provided with teeth on its upper side, and the locking-pawl is mounted on a fixed pivot projecting from one of a pair of levers, and operated by an arm attached to the other lever. By this construction and arrangement the ratchet-bar may be provided with more teeth than when the same are formed on the under side thereof; and the weight of the pawl also aids in holding it engaged with the teeth, so that a weaker spring suffices to hold the levers separated, and less pressure is required to bring them together. The brake-lever proper is not weakened by slotting, and, what is of chief importance, the pawl may pass behind, and thus lock with the rear end of the ratchet-bar, to hold the levers thrown back and the brake-bar out of contact with the wheels.

In the accompanying drawing, forming part of this specification, Figure 1 is a side view, showing my improved brake-lever applied to a wagon. Fig. 2 is an edge view of the same; Fig. 3, a detail view, with part in section.

The lever A is pivoted to the wagon-body at *a*, and provided with a side guard, *b*, by which it is connected with, and guided by, the curved ratchet-bar B. The latter is attached to the side of the wagon-body by studs or brackets. A curved or elbow lever pawl, C, is pivoted to the lever A, in the slot of the guard *b*, at a point just above the ratchet-bar. The means of operating the pawl is a lever, D, which is pivoted to the brake-lever A at a point near its fulcrum *a*, and provided with an arm, *d*, which is notched to receive or engage with the shorter arm of the pawl C. It is, however, apparent that the pawl may be connected to the lever by a slot and pin instead of the arm *d*. A spring, *e*, is attached to upper portion of the brake lever A, and tends to separate it from the pawl lever D.

It will be seen that the arm *d* constitutes the means of connection between the levers A and D, and that the constant pressure exerted on the pawl C to hold its point pressed down and firmly engaged with the teeth of the ratchet B is due to, and measured by, the force of the spring *e*. Further, this force is sufficient to prevent the lever falling or moving forward, although the teeth of the ratchet incline in that direction; but when the upper ends of levers A D are pressed near together, the pawl C will be raised from the ratchet-bar, as shown in broken lines, Fig. 1, and the lever may be moved back to throw the brake out of action.

When the lever A is thrown back to the limit allowed by the stud *f*, as shown in dotted lines, Fig. 1, the pawl C presses against the rounded or angular end of the ratchet-bar, and thus serves to hold the lever in such position, and prevents the rattling which would otherwise result from the motion of the wagon. This, in conjunction with the advantages enumerated at the outset, renders my invention a valuable improvement in its class, while the construction is simple and inexpensive.

What I claim is—

The combination of the ratchet-bar, toothed on its upper side and terminating at the stud *f*, the levers A and D, the elbow-shaped pawl C, mounted on a fixed pivot, the arm *d*, and spring *e*, all constructed and arranged as shown and described, to operate as specified.

JOSIAH B. McAFEE.

Witnesses:
C. TOWNSEND,
W. M. LEEPER.